Feb. 27, 1940.  J. WELLER  2,191,946
TENSIONING DEVICE FOR TRANSMISSION CHAINS AND THE LIKE
Filed Nov. 2, 1937  3 Sheets-Sheet 1

Feb. 27, 1940.  J. WELLER  2,191,946
TENSIONING DEVICE FOR TRANSMISSION CHAINS AND THE LIKE
Filed Nov. 2, 1937  3 Sheets-Sheet 2
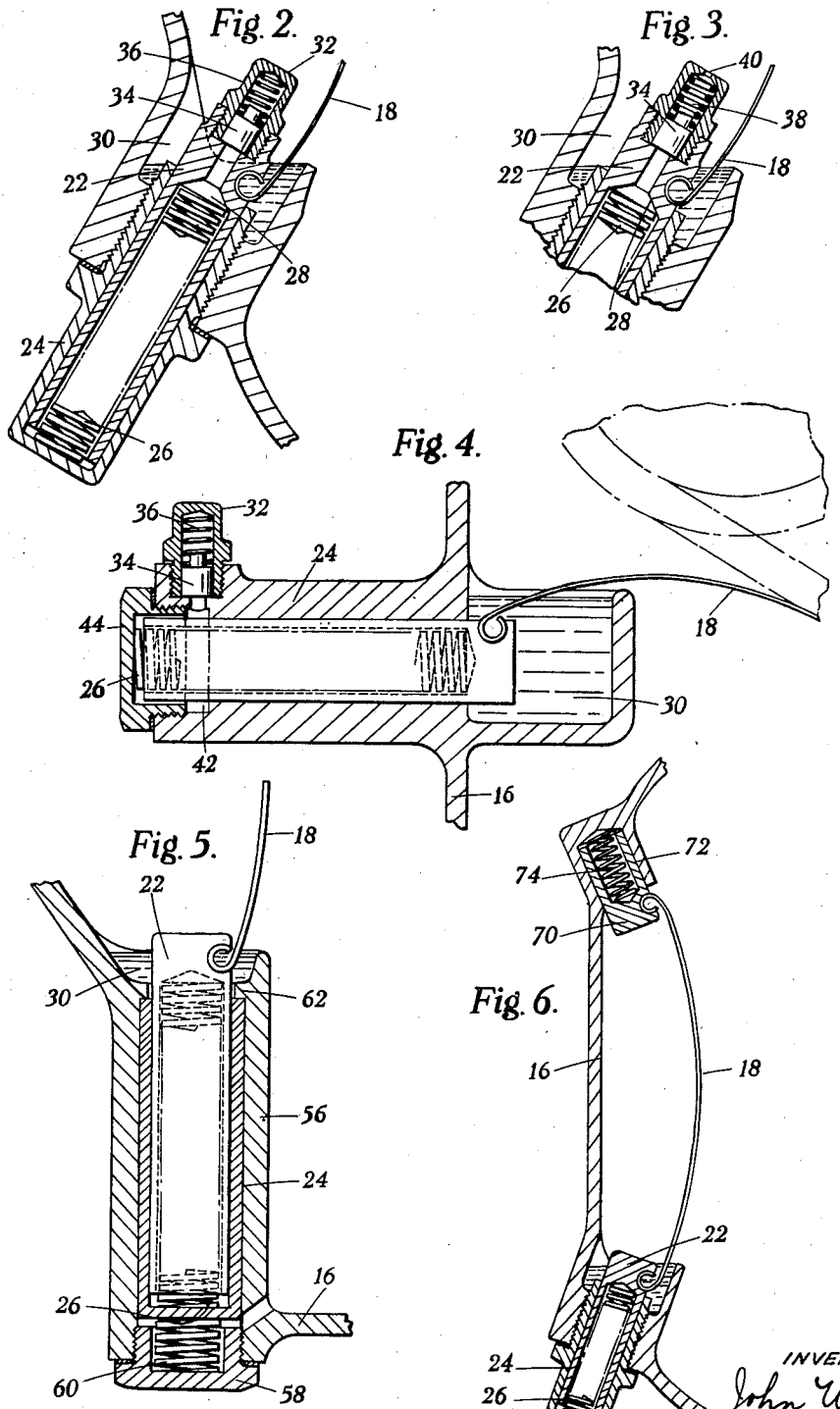

Feb. 27, 1940.     J. WELLER     2,191,946
TENSIONING DEVICE FOR TRANSMISSION CHAINS AND THE LIKE
Filed Nov. 2, 1937     3 Sheets-Sheet 3
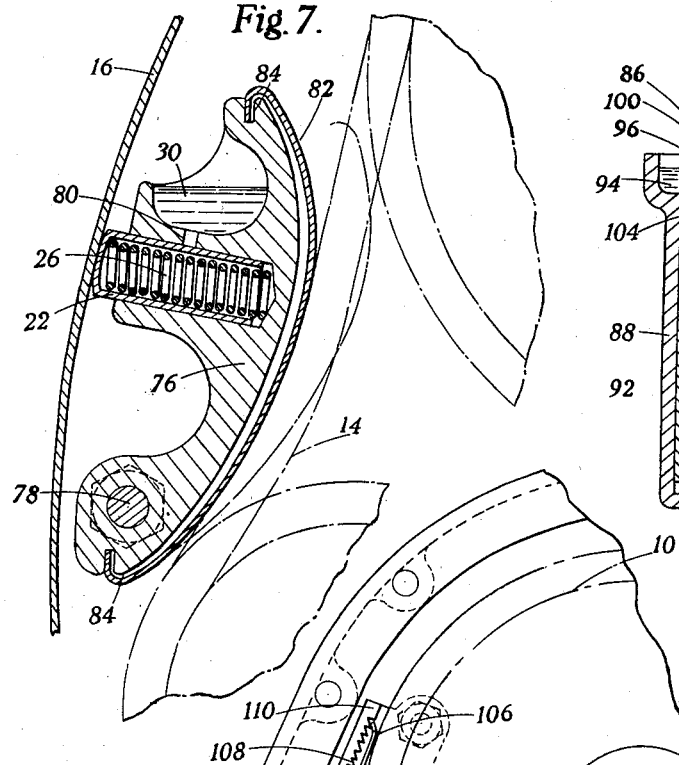
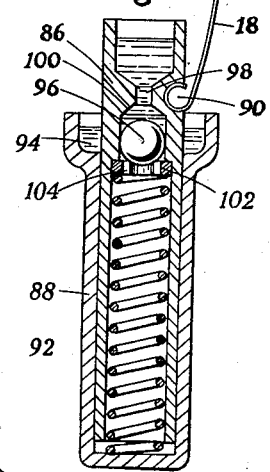
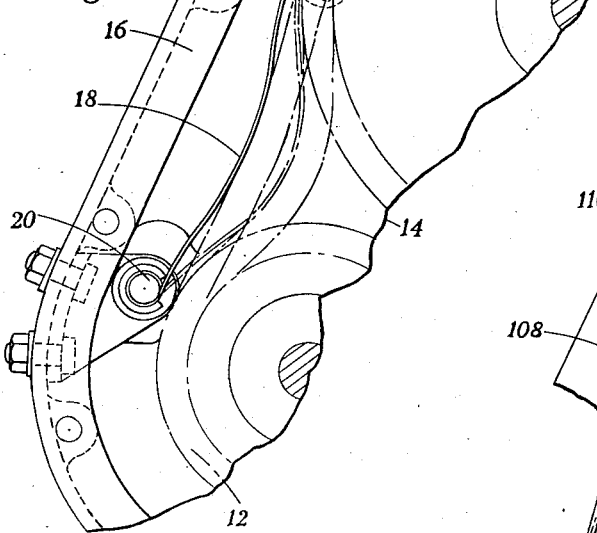
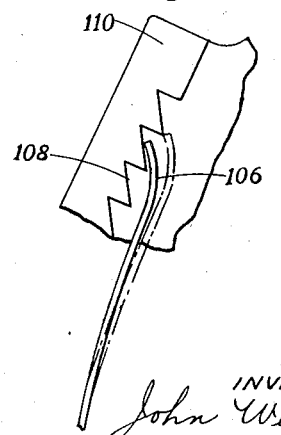
INVENTOR,
John Weller
BY
Frank S. Appleman,
ATTORNEY Patented Feb. 27, 1940

2,191,946

UNITED STATES PATENT OFFICE 2,191,946

TENSIONING DEVICE FOR TRANSMISSION CHAINS AND THE LIKE

John Weller, West Horsley, England

Application November 2, 1937, Serial No. 172,476
In Great Britain November 30, 1936

7 Claims. (Cl. 74—242.11)

This invention relates to tensioning devices for transmission chains, belts or like flexible members, of the kind in which a slipper in the form of a flexible strip conforming to the curvature of the slack side of the chain or other member is pressed thereagainst by resilient means so that it can advance to take up slack in the chain or the like and maintain the tension therein.

The object of the invention is to provide means whereby return movement of the slipper through any substantial distance is prevented or strongly impeded while at the same time the slipper can yield freely or comparatively freely through a small distance to allow for slight inaccuracies such as inequalities in the pitch of the chain or eccentricity of the wheels, and for tightening due to changes of temperature.

According to the present invention, the resilient means causing the slipper to press against the chain or the like is combined with a non-return device for preventing or impeding return movement, for example a hydraulic dashpot, and a lost-motion device is associated with the non-return device, the lost motion being normally taken up by the resilient means but being available for permitting the slipper to yield to a limited extent before the non-return device becomes operative.

Conveniently the non-return device comprises a hydraulic dash-pot consisting of a piston sliding in an oil-filled cylinder from which or into which the oil can flow very slowly. The lost-motion device may consist of a small volume of air trapped in a chamber within the cylinder, or communicating therewith, from which chamber it cannot escape. The compressibility of this small volume of air enables the plunger to yield comparatively freely through a small distance, but as the volume diminishes the pressure increases to an extent which prevents any further movement. Alternatively, the cylinder itself may be mounted to move longitudinally in guides to permit the required lost motion which is normally taken up by a spring arranged in series with the resilient means acting upon the slipper, which may conveniently consist of a coil spring within the cylinder abutting at one end against the plunger and at the other end against the closed end of the cylinder.

Preferably the ends of the flexible strip constituting the slipper are urged towards one another by the resilient means aforesaid so that the strip is caused to bulge and press against the chain or the like. It may, however, be initially curved so that it presses against the chain by its own resilience, one of its ends being pivoted to a fixed point and its other end being formed as or provided with a pawl engaging ratchet teeth, this arrangement automatically providing a small amount of lost motion at all times as will hereinafter be described. Alternatively, the strip may be backed by a rigid member having a convexly curved face from which it is normally separated by a small amount, constituting the desired lost motion, its resilience enabling it to yield until it is in contact with the rigid member.

Referring to the accompanying drawings,

Figure 2 is a view in cross-section of a part of Figure 1.

Figure 3 illustrates a modified construction,

Figure 4 is a view similar to Figure 2 showing an alternative construction,

Figure 5 illustrates an alternative method of providing lost motion,

Figure 6 is a view similar to Figure 1 showing another modified construction,

Figure 7 shows a flexible strip combined with a rigid backing for providing lost motion.

Figure 8 shows yet another hydraulic lost-motion device,

Figure 9 is a view similar to Figure 1 showing an arrangement in which the slipper itself embodies the resilient means for pressing it against the chain, and Figure 10 is a view on an enlarged scale of a part of Figure 9 illustrating a ratchet acting both as a non-return device and as a lost-motion device.

Figure 1:
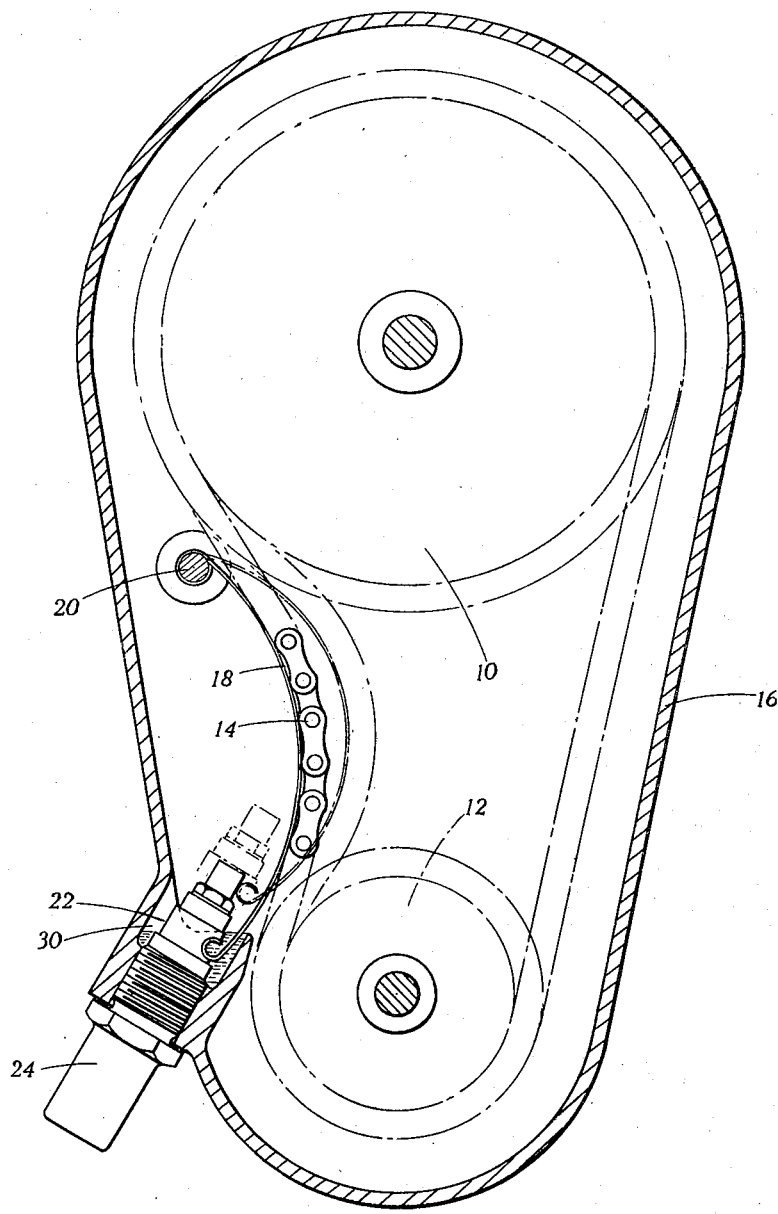
Figure 1 is a side elevation partly in cross-section showing a chain transmission equipped with a chain tensioner according to this invention.

Referring to Figures 1 and 2, two chain wheels 10, 12 are connected together by a transmission chain 14, the wheels and chain being enclosed in a casing 16. A flexible metal strip 18 is pivoted at one end to a pin 20 fixed in the casing and at its other end is pivoted to a plunger 22 sliding within a cylinder 24 secured in the casing. The plunger 22 is tubular and a coil compression spring 26 is housed within it, one end of this spring bearing against the lower closed end of the cylinder and the other end bearing against a shoulder 28 at the upper end of the plunger. The stress in the spring 26 causes the strip 18 to bulge into the curved shape shown and to press against the chain 14, thereby taking up the slack in the chain.

The space within the plunger 22 is filled with oil and a portion of the casing is shaped to provide an oil reservoir 30 surrounding the part of the plunger 22 which protrudes from the cylinder. As the slack in the chain increases the plunger is gradually pushed out of the cylinder by the spring 26 and oil flows into the cylinder past the plunger from the reservoir 30. Any return movement of the plunger is resisted strongly and can take place only slowly because the only outlet for the oil is between the plunger and the cylinder which are a close fit.

If there are slight inaccuracies either in the chain or in the chain wheels, for example slight eccentricity of one or both of the wheels, the chain will be alternately tightened and loosened to a slight extent in rapid succession. Moreover, changes of temperature sometimes cause the chain to tighten owing for example to the fact that the material of the chain casing has a greater coefficient of expansion than the chain itself and this tightening may occur comparatively rapidly. In order to avoid the heavy stresses that would be set up by these actions owing to the fact that the plunger cannot move quickly in the cylinder, lost motion is provided to enable the plunger to move comparatively freely in the cylinder through a small distance. Referring to Figure 2, a small air chamber 32 is screwed into the upper end of the plunger 22. The interior of this air chamber is cylindrical and a small close-fitting plunger 34 slides within it, the air being trapped between this plunger and the upper closed end of the chamber. If there are inaccuracies such as are referred to above causing alternate slight tightening and loosening of the chain, the air within the chamber 32 enables the plunger to move within the cylinder comparatively freely although any considerable movement will raise the pressure of the air sufficiently to oppose such movement strongly. Thus, the range of comparatively free movement of the plunger is very small.

The plunger 34 is not essential but it provides a means for facilitating the assembly of the apparatus with the correct amount of air. If desired a light coil spring 36 may be interposed between the plunger 34 and the closed end of the chamber, the movement of the plunger being opposed both by the pressure of the air and by the stress in the spring.

A modified construction is shown in Figure 3 in which a stiffer spring 38 is used and a breather hole 40 is formed in the upper end of the chamber. Thus, the motion of the plunger is opposed by the spring alone.

Figure 4 illustrates a construction suitable for use when the metal strip 18 extends more or less horizontally and in which therefore the plunger 22 is horizontal. In this case the air chamber 32 is screwed into the upper side of the cylinder 24 near its outer end, and communicates with an annular groove 42 in the cylinder. The cylinder 24 is here shown as an integral part of the casing 16, its outer end being closed by a plug 44. The oil reservoir 30 is formed by an inward extension of the casing 16. Although a plunger 34 is shown within the chamber 32 it is to be understood that this may be omitted if desired, and a hole may be made in the chamber and a relatively stiff spring interposed between the plunger and the upper end of the casing as in Figure 3.

Referring now to Figure 5, the cylinder 24 is mounted to slide freely in a bore formed in a cylindrical portion 56 of the casing 16. The plunger 22 and the spring 26 within it are as described with reference to Figures 1 and 2 except that there is no chamber 32 at its upper end. The lower end of the bore in the part 56 is closed by a plug 58 and a coil compression spring 60 is interposed between this plug and the lower end of the cylinder 24. The upward movement of the cylinder is limited by a shoulder 62 at the upper end of the part 56 and its downward movement is limited by the plug 58. Normally, the spring 60 maintains the cylinder in its uppermost position as shown but the cylinder can move downwards to a slight extent against the pressure of the spring in consequence of slight inaccuracies in the chain or the chain wheels. The upper end of the part 56 is shaped as shown to provide an oil reservoir 30.

In the construction shown in Figure 6 one end of the strip 18 is pivoted to a plunger 22 sliding in an oil cylinder 24 and urged upwardly by a spring 26 as described with reference to Figures 1 and 2. The plunger 22, however, is not provided with an air chamber 32, its upper end being hermetically closed. The other end of the strip 18, instead of being anchored to a fixed point, is pivoted to a second plunger 70 sliding in a bore 72 formed in the casing 16 and a coil compression spring 74 is interposed between the plunger and the end of the bore 72, this spring being comparatively light but nevertheless strong enough to maintain the inner end of the plunger out of contact with the end of the bore under normal conditions, the remainder of the range of movement being available to allow for the periodic slackening and tightening of the chain referred to previously.

In the construction shown in Figure 7 a rigid arm 76 having its face convexly curved as shown is pivoted to a pin 78 fixed in the casing 16. Near its free end this arm is bored to receive a plunger 22 similar to that described with reference to Figure 4, this plunger being urged outwards by a coil compression spring 26 and its free end bearing against the inner side of the casing 16. A hole 80 places the interior of the bore in communication with an oil reservoir 30 formed in the upper end of the arm.

Between the arm 76 and the chain 14 a flexible metal strip 82 is interposed. The extremities of this strip are bent back upon themselves and are housed in slots 84 in the ends of the slipper 76, so as to permit the strip 82 to move towards and away from the slipper 76.

The strip 82 is initially curved to a much shorter radius than the curved face of the arm 76 and its length is such that when it is assembled with this arm it stands away slightly from it as shown, this clearance providing the desired lost motion to enable the strip to yield slightly to allow for the recurrent tightening of the chain.

Referring now to Figure 8, a plunger 86 sliding in a cylinder 88 is pivoted at 90 to the flexible slipper strip 18 and is urged upwardly by a coil compression spring 92. The cylinder and the space within the plunger is filled with oil and an enlarged annular space 94 surmounting the cylinder acts as an oil reservoir as in the constructions previously described. A piston 94 here shown in the form of a metal ball slides freely in the upper part of the plunger but is a relatively close fit therein so that oil can escape past it only very slowly. The bore of the plunger is constricted near its upper end as indicated at 98 and the shoulder 100 is formed as a valve seat. The piston 96 normally rests on a stop 102 in the form of a ring fixed within the plunger and provided with notches 104 to allow oil to flow freely between it and the piston 96. The space above the constricted portion 98 serves as an oil reservoir.

So long as the forces operating on the plunger 86 are small in amount the piston 96 rests upon the stop 102 as shown and the slow leakage of oil past the piston 96 and between the plunger and cylinder prevents the plunger from moving quickly. If, however, a sudden load is placed on the strip 18 the piston 96 is lifted off the stop 102 thereby enabling the plunger to move downwards until the piston is seated against the valve seat 100. Thereupon no further flow of oil can take place within the plunger and further rapid movement is impossible. The vertical play of the piston 96 between the stop 102 and the valve seat 100 provides the required lost motion.

Referring now to Figures 9 and 10, the slipper strip 18 has a considerable initial curvature, rather greater than that shown in the dotted line position, and is made of spring steel. At one end it is pivoted to a pin 20 fixed in the casing 16 and its other end is bent to constitute a pawl 106 cooperating with ratchet teeth 108 formed in a bracket 110 fixed to the casing. When the chain is tight as shown in full lines the strip 18 is flattened as shown, its resilience therefore maintaining it pressed against the chain. As the chain slackens the strip will follow it up owing to its tendency to resume its original curved form and any considerable return movement is prevented by the engagement of the pawl 106 with one or other of the ratchet teeth 108.

It will be apparent that when, as a result of the progressive slackening of the chain, the pawl is near the tip of one of the teeth 108 there will be lost motion of an amount nearly equal to the length of the tooth. Actually, this lost motion is present at all times as will be clear from Figure 10. When the pawl is riding up one of the teeth the strip 18 is being moved as a whole nearer to the chain by reason of the inclination of the tooth. At the moment when the pawl drops from the tip of the tooth on to the inclined flank of the next tooth the strip will not move away from the chain as a whole as it would do if it were rigid, but owing to its resilience it will remain in contact with the chain and will increase its curvature slightly, so that the distance between the tip of the pawl and the pivot pin 20 will be reduced. Immediately after the pawl has dropped it will therefore take up the position shown in full lines in Figure 10, some distance along the sloping side of the tooth, and will be separated from the downwardly facing flank of the tooth from which it has just dropped. Consequently, lost motion will still exist, although it is at a minimum at this stage. This lost motion arises merely from the fact that the slipper strip 18 is resilient and does not involve any special shaping of the ratchet teeth.

I claim:

1. A tensioning device for transmission chains, belts and like flexible members comprising a flexible strip constituting a slipper conforming to the curvature of the slack side of the flexible member and pressed thereagainst by resilient means, a hydraulic dashpot connected to said slipper and constituting a device for impeding return movement of the slipper, said hydraulic dashpot including a chamber communicating with the interior of the cylinder thereof and containing a small volume of air enabling the piston of the dashpot to yield slightly under the influence of sudden force applied to it by the flexible member.

2. The combination with the tensioning device of claim 1 of a spring-pressed piston freely sliding within said chamber.

3. A tensioning device for transmission chains, belts or like flexible members comprising a flexible strip constituting a slipper conforming to the curvature of the slack side of the flexible member and pressed thereagainst by resilient means, a hydraulic dashpot comprising a liquid-filled cylinder and a piston sliding within it past which the liquid can flow very slowly, guides within which the cylinder can slide and a spring for controlling the sliding movement of the cylinder.

4. A tensioning device for transmission chains, belts or like flexible members comprising in combination a flexible strip constituting a slipper and conforming to the curvature of the slack side of the flexible member, resilient means tending to urge one end of said slipper towards its other end thereby pressing the slipper against the flexible member, a non-return device connected to the first-mentioned end of the slipper and means permitting the other end of the slipper to yield through a small distance against resilient pressure in a direction away from the end first mentioned.

5. A tensioning device for transmission chains, belts or like flexible members comprising in combination a flexible strip of resilient material constituting a slipper having an initial curvature greater than the curvature of the slack side of the flexible member to which it is to be applied, a rigid curved member mounted movably towards and away from the flexible member and supporting said slipper, resilient means applied to said member to press the slipper against the slack side of the flexible member so that a gap exists between the curved surface of the said member and the slipper and a non-return device impeding return movement of the said member, the gap between the slipper and the rigid member affording a degree of lost motion opposed by the resilience of the slipper itself.

6. A tensioning device for transmission chains, belts or like flexible members comprising in combination a flexible strip constituting a slipper conforming to the curvature of the slack side of said flexible member, said slipper being anchored at one end and free at the other end, resilient means for pressing said slipper against said flexible member, a non-return device associated with the free end of the slipper for impeding return movement, a lost-motion device associated with said non-return device for permitting the slipper to yield to a limited extent before the non-return device becomes operative, said non-return device comprising in combination a liquid filled cylinder, a hollow plunger sliding therein, a spring within said plunger tending to move it out of the cylinder, a piston freely sliding within said hollow plunger, said plunger being formed with a valve seat on one side of the piston and a stop on the other side thereof, whereby liquid escaping past the piston enables the plunger to move slowly under the action of the spring and whereby a sudden force applied to the plunger causes the piston to move from the position in which it is supported by the stop to the position in which it is in engagement with the valve seat.

7. A tensioning device for transmission chains, belts or like flexible members comprising in combination a flexible strip constituting a slipper conforming to the curvature of the slack side of the flexible member, resilient means for pressing said slipper against the flexible member, a hydraulic dashpot device for impeding return movement and a lost-motion device associated with said dashpot device for permitting the slipper to yield to a limited extent before the dashpot device becomes operative.

JOHN WELLER.